(12) United States Patent
Sandhu et al.

(10) Patent No.: US 9,491,569 B1
(45) Date of Patent: Nov. 8, 2016

(54) METHOD OF AND APPARATUS FOR HOMOGENIZING EXPECTED DATA-HARVEST YIELDS

(71) Applicant: Global Technology Associates, LLC, Reston, VA (US)

(72) Inventors: Sandip Sandhu, San Diego, CA (US); Behrouz Heshmatipour, Aliso Viejo, CA (US); Mark Roger Patterson, San Diego, CA (US); Vincent Carl Star, Fallbrook, CA (US)

(73) Assignee: GLOBAL TECHNOLOGY ASSOCIATES, LLC, Reston, VA (US)

( * ) Notice: Subject to any disclaimer, the term of this patent is extended or adjusted under 35 U.S.C. 154(b) by 0 days.

(21) Appl. No.: 14/857,765

(22) Filed: Sep. 17, 2015

(51) Int. Cl.
| | | |
|---|---|---|
| *H04W 40/00* | (2009.01) | |
| *H04W 4/00* | (2009.01) | |
| *H04W 16/18* | (2009.01) | |
| *H04W 24/02* | (2009.01) | |
| *H04W 16/24* | (2009.01) | |
| *H04W 24/00* | (2009.01) | |

(52) U.S. Cl.
CPC ............ *H04W 4/006* (2013.01); *H04W 16/18* (2013.01); *H04W 16/24* (2013.01); *H04W 24/02* (2013.01); *H04W 24/00* (2013.01)

(58) Field of Classification Search
CPC ... H04W 4/006; H04W 16/18; H04W 16/24; H04W 24/00; H04W 24/02
USPC ................................ 455/446, 449, 450, 448
See application file for complete search history.

(56) References Cited

U.S. PATENT DOCUMENTS

| | | | |
|---|---|---|---|
| 9,344,353 B2* | 5/2016 | Meredith | ............ H04L 63/0263 |
| 9,369,902 B1* | 6/2016 | Sandhu | ................. H04W 24/08 |
| 2010/0174558 A1* | 7/2010 | Smith | .................... G06F 19/322 |
| | | | 705/3 |
| 2011/0201336 A1* | 8/2011 | Garrett | ............. H04W 36/0066 |
| | | | 455/436 |

* cited by examiner

*Primary Examiner* — Khai M Nguyen
(74) *Attorney, Agent, or Firm* — Symbus Law Group, LLC; Charles B. Lobsenz

(57) ABSTRACT

A method of homogenizing expected data-harvest yields, the method comprising: selecting a population of data-sources; selecting a quantity of data as a data-harvest maximum, $H_{max}$; and dividing the population into a set of groups according to the data-harvest maximum $H_{max}$ such that: each group includes at least one data-source; and each group generates an expected data-harvest yield, $H_{yield}$, that is less than or equal to the data-harvest maximum $H_{max}$, $H_{yield} \leq H_{max}$.

26 Claims, 12 Drawing Sheets

METHOD OF AND APPARATUS FOR HOMOGENIZING EXPECTED DATA-HARVEST YIELDS

FIELD OF THE DISCLOSURE

Embodiments of the present invention relate to methods of and apparatuses for homogenizing expected data-harvest yields, e.g., in the context of a wireless (e.g., cellular communication) network.

BACKGROUND

FIG. 1A is a block diagram, according to the Background Art, of a wireless network 100, e.g., a cellular network. FIG. 1B is a block diagram, according to the Background Art, of a cell-site. FIG. 1C is a block diagram, according to the Background Art, of a base station controller (BSC). And FIG. 1C is a block diagram, according to the Background Art, of mobile switching center (MSC).

In FIG. 1A, wireless network 100 includes cells 104 as well as cell-sites (or base transceiver stations (BTSs)) 102. Cells 104 represent the geographical areas of cellular coverage provided by different combinations of cell-sites 102, respectively. For ease of illustration, cells 104 are depicted as hexagons. Cell-sites 102 are located at many (though not necessarily at all) of the corners of cells 104. Also for ease of illustration, only nine instances of cell-site 102 and ten instances of cell 104 are illustrated in FIG. 1A; other quantities of instances of cell-site 102 and other quantities of instances of cell 104, respectively, are contemplated.

In terms of physical components (as illustrated by exploded view 102' of FIG. 1B), each cell-site 102 includes: one or more instances of a processor 108; memory 110 which itself includes one or more instances of non-volatile memory 112A and one or more instances of volatile memory 112B; one or more instances of a wireless unit 114; and a tower 116 which itself includes one or more instances of an antenna (not illustrated in FIG. 1B) mounted thereon, e.g., a directional antenna. Typically (though not necessarily), the geographic area of a given one of cells 114 represents a combination of areas covered by two or more sectors (not illustrated in FIG. 1A), with each sector being provided by a different one of cell-sites 102, respectively. Typically (though not necessarily), a given one of cell-sites 102 includes at least three instances of wireless unit 114 and at least three instances of an antenna mounted on tower 116 so as to provide cellular coverage of at least three sectors (arranged radially 120 degrees apart) in at least three of cells 104, respectively.

Pairings of an instance of wireless unit 114 and its corresponding instance of an antenna mounted on tower 116 can reflect different and/or the same wireless communication technologies, respectively. For example, such wireless communication technologies include: GSM; CDMA; EVDO, LTE, etc.

Wireless network 100 further includes base station controllers (BSCs) 106 and at least one mobile switching center (MSC) 128. Typically, though not necessarily, an instance of BSC 106 controls multiple cell-sites 102. MSC 128 is typically connected via a backhaul network 140 to a public switched telephone network (PSTN) 142 and to the internet 144. Between MSC 128 and PSTN 142, backhaul network 140 can be comprised of wired and/or wireless connections. Similarly, between MSC 128 and internet 144, backhaul network 140 can be comprised of wired and/or wireless connections, and can include routers, etc.

In terms of physical components (as illustrated by exploded view 106' in FIG. 1C), MSC 128 includes: one or more instances of a processor 130; and memory 132 which itself includes one or more instances of non-volatile memory 134A and one or more instances of volatile memory 134B. Typically, a given instance of MSC 128 not only engages in wired communication, but also communicates wirelessly; accordingly, the given instance of MSC 128 can further include: one or more instances of a wireless unit 136; and a tower 138 which itself includes one or more instances of an antenna (not illustrated in FIG. 1C) mounted thereon, e.g., a directional antenna.

Typically, an instance of MSC 128 is connected to multiple instances of BSC 106. In terms of physical components (as illustrated by exploded view 128' in FIG. 1D), each MSC 128 includes: one or more instances of a processor 130; and memory 132 which itself includes one or more instances of non-volatile memory 132A and one or more instances of volatile memory 132B. If a given instance of MSC 128 not only engages in wired communication, but also communicates wirelessly, then the given instance of MSC 128 further includes: one or more instances of a wireless unit 136; and a tower 138 which itself includes one or more instances of an antenna (not illustrated in FIG. 1D) mounted thereon, e.g., a directional antenna.

Various tracking units (not illustrated) in wireless network 100 collect tracking data regarding one or more instances of cell-site 100. Such tracking data includes, for example, raw call logs, billing data, operations support systems (OSS) data, business support systems (BSS) data, etc. Also, various performance assessment units (not illustrated) in wireless network 100 assess the performance of cell-sites 102 in terms of one or more key performance indicators (KPIs), respectively. KPIs are examples of metrics that are representative of physical things/phenomena. Such tracking/KPI data can be made available across wireless network 100. In addition to tracking/KPI data, there are other varieties of data (e.g., cashed content, etc.) that are available across wireless network 100. Together, tracking/KPI data and such other varieties of data will be referred to as network-related data.

In terms of LTE, for example, there are KPIs defined for the evaluation of system performance, e.g., the performance of the evolved Radio Access Network (eRAN). Such KPIs can be classified, e.g., into categories based on the measurement targets: accessibility, retainability, mobility, service integrity, utilization, availability, and traffic KPIs.

LTE Accessibility KPIs are indicative of whether services requested by a user can be accessed within specified tolerances in the given operating conditions. Examples of LTE Accessibility KPIs include: RRC Setup Success Rate (Service); RRC Setup Success Rate (Signaling); ERAB Setup Success Rate (e.g., for VoIP call service); ERAB Setup Success Rate (e.g., for all types of calling service); and Call Setup Success Rate.

LTE Retainability KPIs are indicative of the network's capability to retain services requested by a user for a desired duration once the user is connected to the services, e.g., are indicative of whether the system can maintain desired service quality levels. Examples of LTE Retainability KPIs include: Call Drop Rate (e.g., for VoIP); and Service Drop Rate (e.g., for all types of calling service).

LTE Mobility KPIs are indicative of the performance of E-UTRAN mobility, which has a direct effect on customer experience. Examples of LTE Mobility KPIs include: Intra-frequency Handover Out Success Rate; Inter-frequency Handover Out Success Rate; Handover In Success Rate;

Inter-RAT (Inter-Radio-Access-Technology) Handover Out Success Rate (LTE to CDMA); Inter-RAT Handover Out Success Rate (LTE to WCDMA); and Inter-RAT Handover Out Success Rate (LTE to GSM).

LTE service integrity KPIs are indicative of the impacts on the service quality provided to the end-user made by the E-UTRAN. Examples of LTE service integrity KPIs include: Service Downlink Average Throughput; Service Uplink Average Throughput; Cell Downlink Average Throughput; Cell Uplink Average Throughput; Cell Downlink Maximum Throughput; and Cell Uplink Maximum Throughput.

LTE Utilization KPIs are indicative of the network's capability to meet the traffic demand and other characteristics, e.g., under specific internal conditions. Examples of LTE Utilization KPIs include: Resource Block Utilizing Rate; and Average CPU Load.

LTE Availability KPIs are indicative of the percentage of time that a cell is available, e.g., the percentage of time that an eNodeB can provide EPS bearer services. An example of an LTE Availability KPIs is Radio Network Unavailability Rate.

LTE Traffic KPIs are indicative of traffic volume on the LTE Radio Access Network (RAN), many of which are classified into the following categories: radio bearers; downlink traffic volume; and uplink traffic volume. Examples of LTE Traffic KPIs in the radio bearers category include: RadioBearers_total; RadioBearers_QCI_1; RadioBearers_QCI_2; RadioBearers_QCI_3; RadioBearers_QCI_4; RadioBearers_QCI_5; RadioBearers_QCI_6; RadioBearers_QCI_7; RadioBearers_QCI_8; and RadioBearers_QCI_9. Examples of LTE Traffic KPIs in the downlink traffic volume category include: DLTrafficVolume_total (total of traffic volume for DRBs); DLTrafficVolume_QCI_1; DLTrafficVolume_QCI_2; DLTrafficVolume_QCI_3; DLTrafficVolume_QCI_4; DLTrafficVolume_QCI_5; DLTrafficVolume_QCI_6; DLTrafficVolume_QCI_7; DLTrafficVolume_QCI_8; and DLTrafficVolume_QCI_9. Examples of LTE Traffic KPIs in the pulling traffic volume category include: ULTrafficVolume_total (total of traffic volume for DRBs); ULTrafficVolume_QCI_1; ULTrafficVolume_QCI_2; ULTrafficVolume_QCI_3; ULTrafficVolume_QCI_4; ULTrafficVolume_QCI_5; ULTrafficVolume_QCI_6; ULTrafficVolume_QCI_7; ULTrafficVolume_QCI_8; and ULTrafficVolume_QCI_9. Additional examples of LTE Traffic KPIs include: Average User Number (e.g., average number of users which has the RRC connection in the cell in a given period); and Maximum User Number (e.g., maximum number of users which has the RRC connection in the cell in a given period).

There are metrics associated with routers which are representative of physical things/phenomena. Examples of such metrics include: Flow capacity; Hop count of a route; Buffer size; Instantaneous queue size; Total time in queue; Mean time in queue; router availability; Packet loss; Average packet loss; Average round-trip latency; Average jitter; Network packet loss; Average network round-trip latency; Network asset efficiency; Number of installed versus utilized ports (e.g., per type); Watts per active port; Average number of retransmissions of network packets per measurement period (e.g., daily); Average throughput; etc.

SUMMARY

It is to be understood that both the following summary and the detailed description are exemplary and explanatory and are intended to provide further explanation of the present invention as claimed. Neither the summary nor the description that follows is intended to define or limit the scope of the present invention to the particular features mentioned in the summary or in the description. Rather, the scope of the present invention is defined by the appended claims.

In certain embodiments, the disclosed embodiments may include one or more of the features described herein.

An aspect of the present invention provides a method of a method of homogenizing expected data-harvest yields, the method comprising: selecting a population of data-sources; selecting a quantity of data as a data-harvest maximum, $H_{max}$; and dividing the population into a set of groups according to the data-harvest maximum $H_{max}$ such that: each group includes at least one data-source; and each group generates an expected data-harvest yield, $H_{yield}$, that is less than or equal to the data-harvest maximum $H_{max}$, $H_{yield} \leq H_{max}$.

Another aspect of the present invention provides apparatus for a method of locating data-storage devices, the method comprising: selecting a geographic territory in which are located data-sources; selecting a quantity of data as a data-harvest maximum, $H_{max}$; and dividing the territory into a set of substantially geographically-contiguous zones according to the data-harvest maximum $H_{max}$ such that (1) each zone includes at least one data-source, and (2) each zone generates an expected data-harvest yield, $H_{yield}$, that is less than or equal to the data-harvest maximum $H_{max}$, $H_{yield} \leq H_{max}$; resource-provisioning, for each zone, one or more data-storage devices on which the corresponding data-harvest yield $H_{yield}$ will be stored; selecting a maximum data-retrieval latency, $DRL_{max}$; and determining, for each zone, a geographic location of the corresponding one-or more data-storage devices sufficiently proximal to the zone such that an attempt by a given user, who is located in the geographic territory, to access at least some of the data-harvest yield $H_{yield}$ will experience a data-retrieval latency, $DRL_{exp}$, that is $DRL_{exp} \leq DRL_{max}$.

Yet another aspect of the present invention provides an apparatus for homogenizing expected data-harvest yields, the apparatus comprising: a selection unit configured to: facilitate a selection of a geographic territory in which are located data-sources; facilitate a selection of a quantity of data as a data-harvest maximum, $H_{max}$; and a decomposition unit configured to divide the territory into a set of substantially geographically-contiguous zones according to the data-harvest maximum $H_{max}$ such that: each zone includes at least one data-source; and each zone generates an expected data-harvest yield, $H_{yield}$, that is less than or equal to the data-harvest maximum $H_{max}$, $H_{yield} \leq H_{max}$.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments of the present invention will be more particularly described in conjunction with the following drawings wherein.

DETAILED DESCRIPTION

Figure 1A:
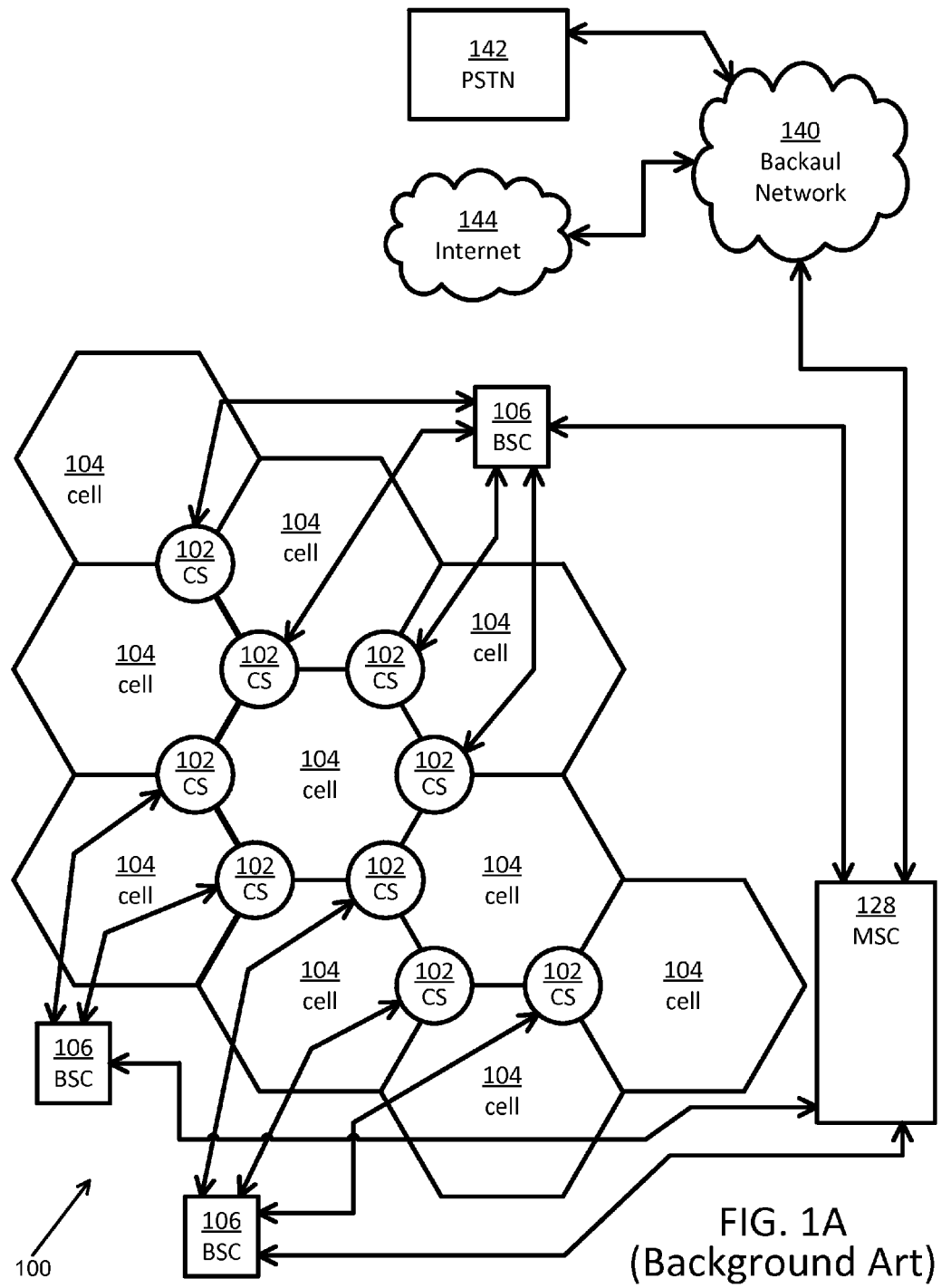
FIG. 1A is a block diagram, according to the Background Art, of a wireless network.
Figure 1B:
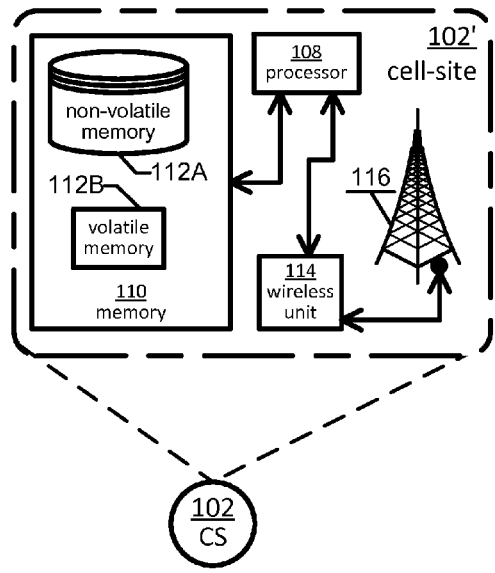
FIG. 1B is a block diagram, according to the Background Art, of a cell-site.
Figure 1C:
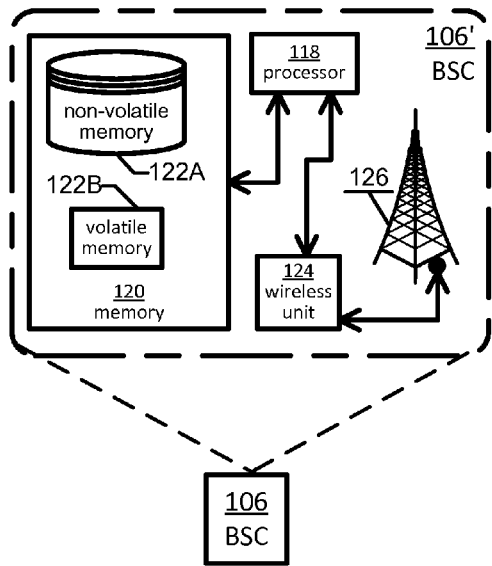
FIG. 1C is a block diagram, according to the Background Art, of a base station controller (BSC)
Figure 1D:
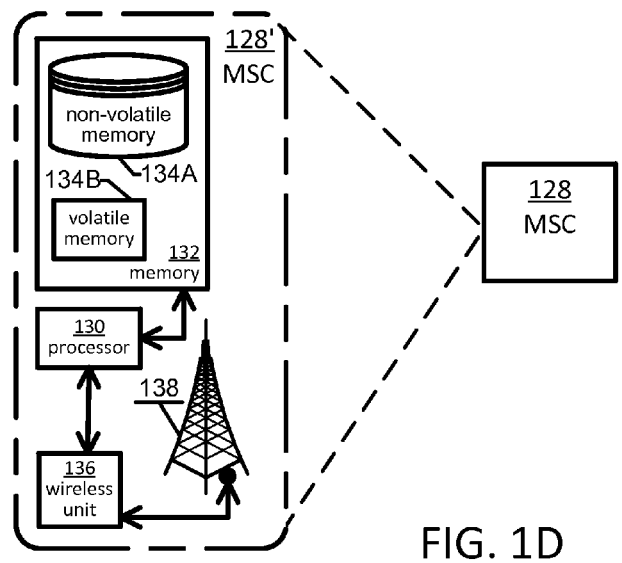
FIG. 1D is a block diagram, according to the Background Art, of mobile switching center (MSC)

This specification discloses one or more embodiments that incorporate features of the present invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. The skilled artisan will appreciate that a particular feature, structure, or characteristic described in connection with one embodiment is not necessarily limited to that embodiment but typically has relevance and applicability to one or more other embodiments.

In the several figures, like reference numerals may be used for like elements having like functions even in different drawings. The embodiments described, and their detailed construction and elements, are merely provided to assist in a comprehensive understanding of the present invention. Thus, it is apparent that the present invention can be carried out in a variety of ways, and does not require any of the specific features described herein. Also, well-known functions or constructions are not described in detail since they would obscure the present invention with unnecessary detail.

The description is not to be taken in a limiting sense, but is made merely for the purpose of illustrating the general principles of the present invention, since the scope of the present invention is best defined by the appended claims.

It should also be noted that in some alternative implementations, the blocks in a flowchart, the communications in a sequence-diagram, the states in a state-diagram, etc., may occur out of the orders illustrated in the figures. That is, the illustrated orders of the blocks/communications/states are not intended to be limiting. Rather, the illustrated blocks/communications/states may be reordered into any suitable order, and some of the blocks/communications/states could occur simultaneously.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol. Examples of such networks include, PSTN, LAN, WAN, WiFi, WiMax, Internet, World Wide Web, Ethernet, other wireless and wired networks, and the like.

The phrase "wireless device" is used herein to mean one or more conventional or proprietary devices using radio frequency transmission techniques. Examples of such wireless devices include cellular telephones, desktop computers, laptop computers, handheld computers, electronic games, portable digital assistants, MP3 players, DVD players, or the like.

In developing embodiments of the present invention, among other things, the inventors thereof:
  recognized that infrastructure which stores data (storage-infrastructure, e.g., a cloud-based data center) typically is located remotely, in terms of geographical distance, from:
    the source of the data being stored therein; and
    users who wish to access the data being stored therein, respectively;
  recognized that storage-infrastructure used to archive network-related data tends to configure data-retrieval capability such that newer data can be retrieved more quickly than older data irrespective of the instances of cell-site 102 that were the sources thereof;
  recognized that storage-infrastructure used to archive network-related data tends NOT to be configure data-retrieval capability such that tracking-network-related data (irrespective of relative age) for instances of cell-sites 102 that are in relatively close proximity to a user can be retrieved more quickly than network-related data (irrespective of relative age) for instances of cell-sites 102 that are in relatively far proximity to the user;
  recognized that network-related data for a given instance of cell-site 102 tends to be located in the noted remote storage-infrastructure and typically is sufficiently voluminous such that a user wishing to access the same typically is subjected to unacceptably long access latencies;
  recognized that a user who accesses network-related data for a given group of one or more cell-sites 102 is typically located in relatively close proximity to the group of one or more cell-sites 102;
  recognized that the cost to store network-related data in storage-infrastructure that is located in relatively close proximity to the group of one or more cell-sites 102 is likely to be relatively more expensive than storing the same in remote data-storage-infrastructure, and that this greater expense nevertheless can be offset by the decreases in access latencies achieved by the relatively close proximity; and
  recognized that the cost to store network-related data in data-storage-infrastructure that is located in relatively close proximity to the group of one or more cell-sites 102 can be reduced by organizing data being stored into manageable quantities.

One or more embodiments of the present invention provide a method of and an apparatus for homogenizing expected data-harvest yields, which thereby facilitates storage of network-related data in data-storage-infrastructure that is located in relatively close proximity to the group of one or more cell-sites 102, etc., which generated the same.

Figure 2A:
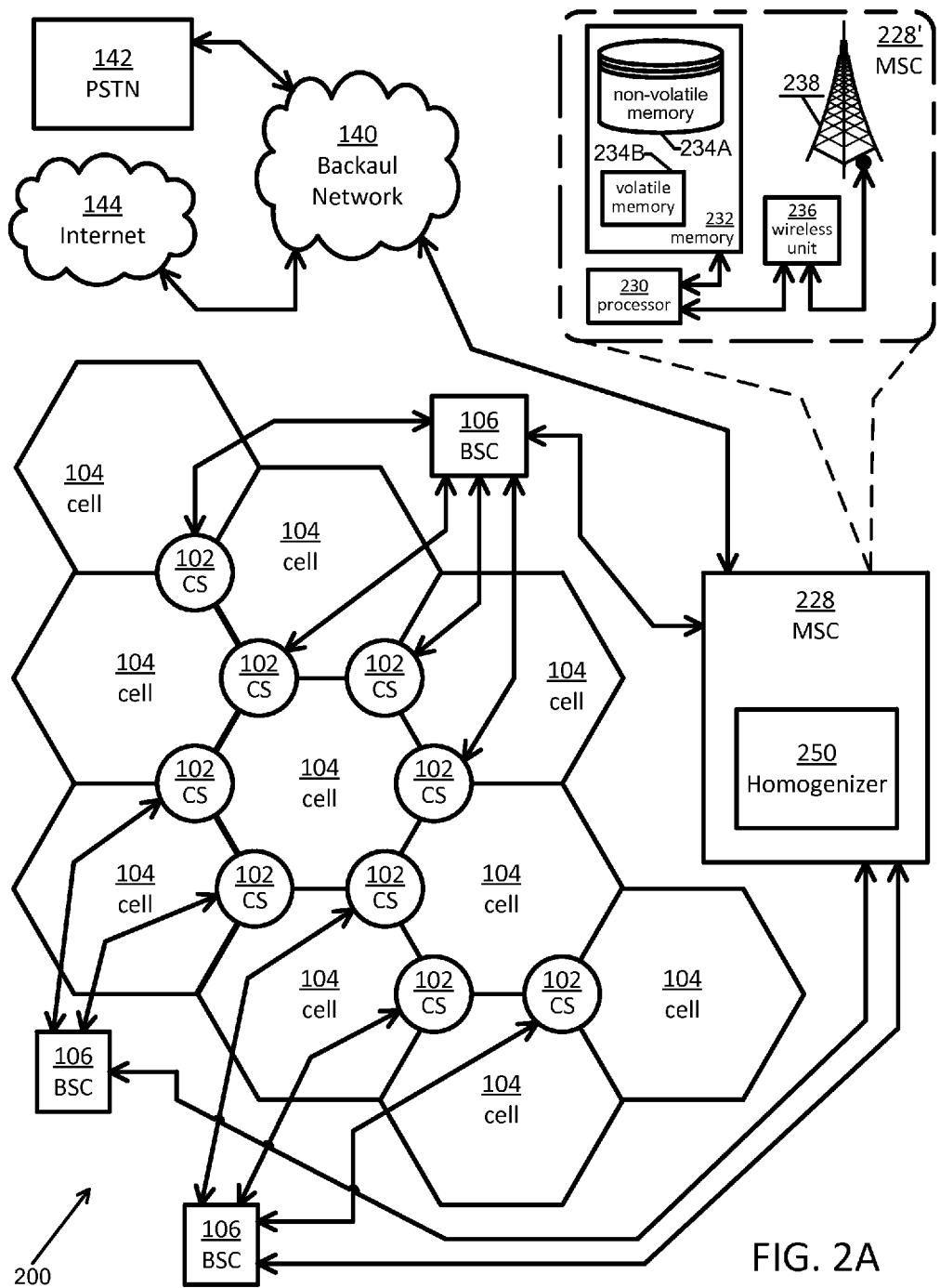
FIG. 2A is a block diagram, according to an embodiment of the present invention, of a homogenizer associated with a wireless network.

FIG. 2A is a block diagram, according to an embodiment of the present invention, of homogenizer 250 associated with a wireless network 200.

Wireless network 200 of FIG. 2A is similar to wireless network 100 of FIG. 1 in that it includes cells 104 as well as cell-sites (or base transceiver stations (BTSs)) 102. For the sake of brevity, further discussions of the details of components which wireless network 200 shares in common with wireless network 100 are not provided here; rather the reader is referred to the discussion (above) of FIG. 1. Also for ease of illustration, only nine instances of cell-site 102 and ten instances of cell 104 are illustrated in FIG. 1A; other quantities of instances of cell-site 102 and other quantities of instances of cell 104, respectively, are contemplated.

In terms of physical components (as illustrated by exploded view 228'), each MSC 228 includes: one or more instances of a processor 230; and memory 232 which itself includes one or more instances of non-volatile memory 232A and one or more instances of volatile memory 232B. Typically, a given instance of MSC 128 not only engages in wired communication, but also communicates wirelessly; accordingly, the given instance of MSC 228 can further include: one or more instances of a wireless unit 236; and a tower 238 which itself includes one or more instances of an antenna (not illustrated in FIG. 2A) mounted thereon, e.g., a directional antenna.

Among other things, however, wireless network 200 differs from wireless network 100 in that mobile switching center (MSC) 228 further includes homogenizer 250. Homogenizer 250 is an example of an apparatus for homogenizing expected data-harvest yields, with such data being generated by cell-sites 102, etc., in wireless network 200. Homogenizers such as homogenizer 250 are discussed in more detail below in the context the homogenizer of FIG. 4 et seq.

At least in part, homogenizer 250 can be implemented, e.g., as executable code stored in one or more of memories 234A-234B, with such code being executable by one or more instances of processor 230. Homogenizer 250 is discussed in more detail below.

Figure 2B:
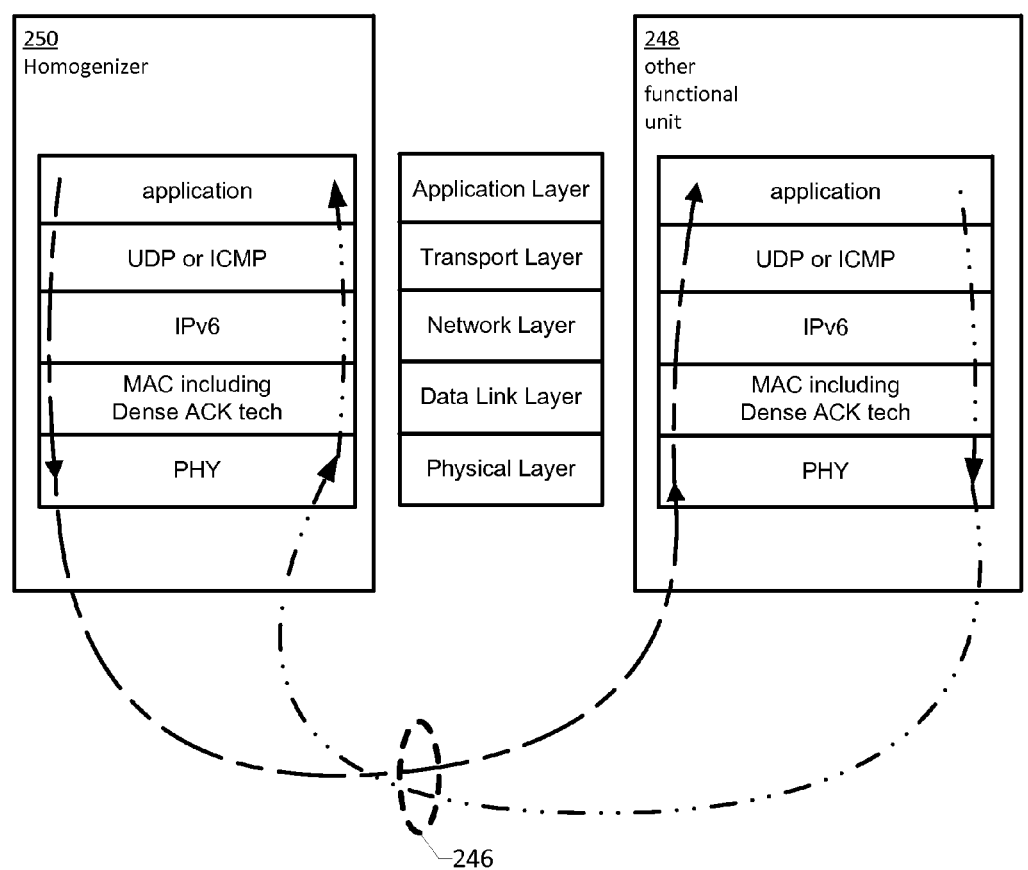
FIG. 2B is a communication-layer diagram illustrating the path of flow during an instance of a communication session between, e.g., a homogenizer an another instance of some other functional unit.

FIG. 2B is a communication-layer diagram illustrating the path of flow during an instance of a communication session 246 between, e.g., homogenizer 250 and an instance of some other functional unit 248, e.g., data-storage center 502

(discussed below), an instance of DSR 504 (discussed below), etc., according to an embodiment of the present invention.

Homogenizer 250 (as noted above) and the instance of other functional unit 248 can be implemented at least in part, e.g., as executable code stored in one or more of the noted (above) memories thereof and executed by one or more of the noted (above) processor units thereof, respectively. Such implementations can conform to the communication-layer diagram of FIG. 2B.

Homogenizer 250 can have a stack based (in part); on industry-standard layers. The layers illustrated in FIG. 2B represent but one example of combinations of layers that can be included in such stacks, respectively. Such layers, from bottom to top, for example (as illustrated in FIG. 2B), can include: a physical layer; a data link (or MAC) layer; a network layer (e.g., an IP layer); a transport layer (e.g., a UDP layer or ICMP layer); and an application layer. Alternatively, different combinations of layers could be used in the stack.

Figure 3:
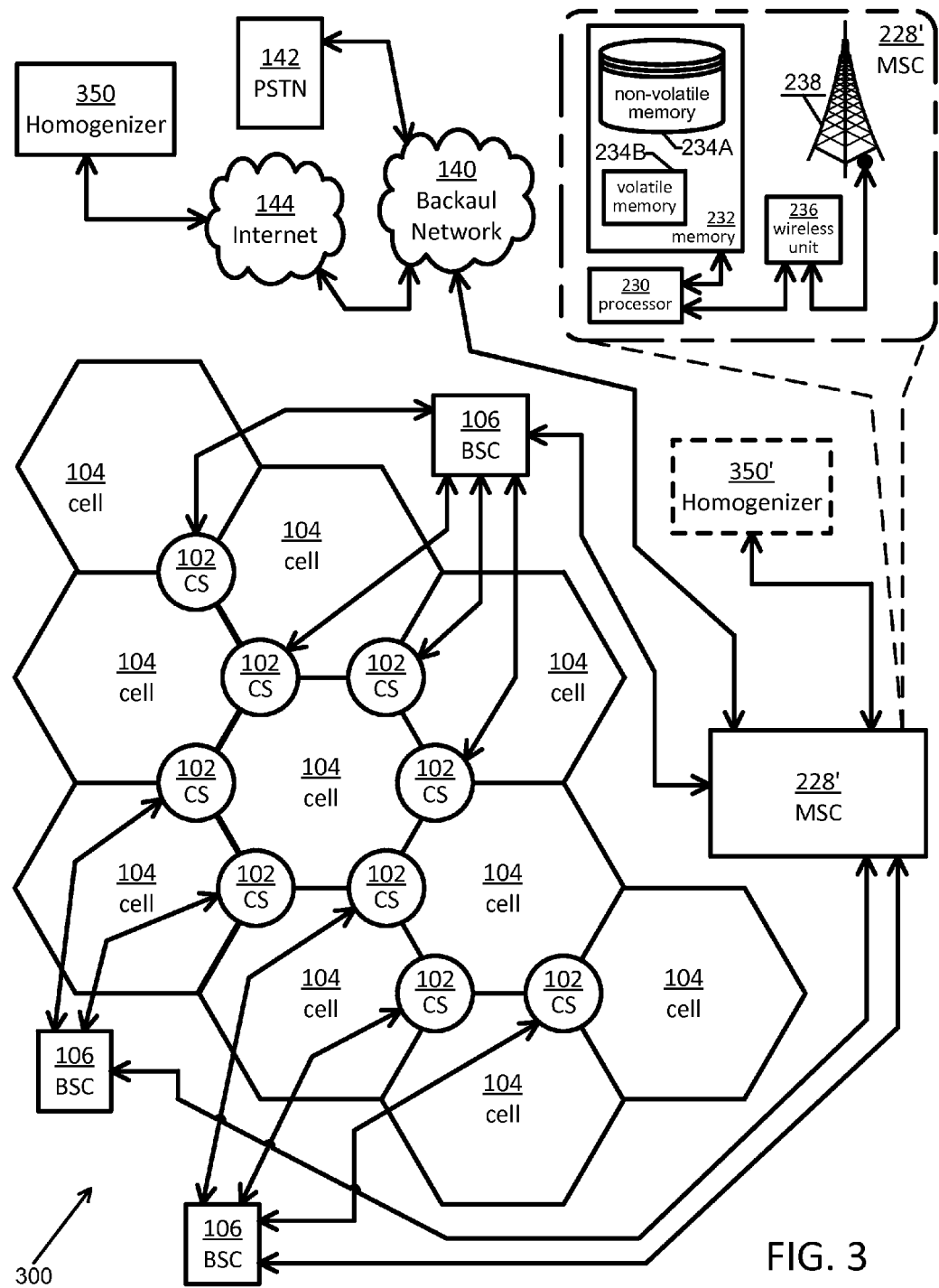
FIG. 3 is a block diagram, according to an embodiment of the present invention, of another homogenizer associated with a wireless network.

FIG. 3 is a block diagram, according to an embodiment of the present invention, of another homogenizer 350 associated with a wireless network 300.

Wireless network 300 of FIG. 3 is similar to wireless network 200 of FIG. 2A in that it includes a homogenizer 350. Like homogenizer 250, homogenizer 350 is an example of an apparatus for homogenizing expected data-harvest yields, with such data being generated by cell-sites 102, etc., in wireless network 200.

In contrast to homogenizer 250 of wireless network 200 (which is located within MSC 228), homogenizer 350 of wireless network 300 is located outside of MSC 228'. In particular, homogenizer 350 is connected to wireless network 300 via internet 144 and backhaul network 140. Alternatively, a different implementation could connect a homogenizer 350' (illustrated in phantom lines in FIG. 3) directly to wireless network 300 without internet 144 as an intermediary connection, e.g., it could be connected directly to MSC 228'. Homogenizers such as homogenizers 350/350' are discussed in more detail below in the context of the homogenizer FIG. 4 et seq.

Returning to FIG. 2A, MSC 228 (and thus homogenizer 250) is typically located within a geographical area covered by instances of BSC 106 that report to (or are serviced by) MSC 128 or at least in relatively close physical proximity the geographical area. By contrast, and returning to FIG. 2B, the proximity of homogenizer 350 to the geographical area could be similar to that of homogenizer 250, but the proximity of homogenizer 350 to the geographical area could also be relatively moderately far away or relatively very far away (relatively remote) from the geographical.

Figure 4A:
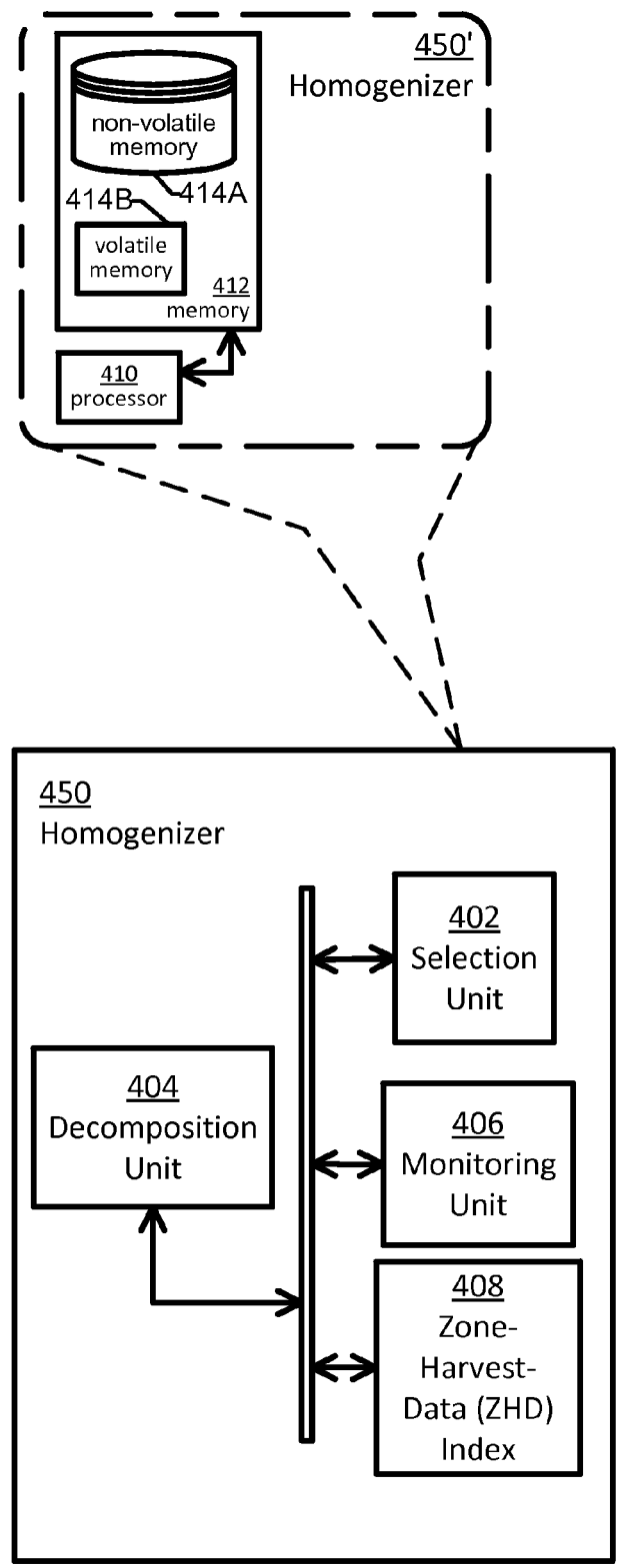
FIG. 4A is a block diagram, according to an embodiment of the present invention, of a homogenizer.

FIG. 4A is a block diagram, according to an embodiment of the present invention, of a homogenizer 450.

In FIG. 4A, homogenizer 450 includes: a selection unit 402; a decomposition unit 404; a monitoring unit 406; and a zone-harvest-data (ZHD) index 408.

In terms of physical components (as illustrated by exploded view 450'), homogenizer 450 can include: one or more instances of a processor 410; and memory 412 which itself includes one or more instances of non-volatile memory 414A and one or more instances of volatile memory 414B. Similar to homogenizer 250/350/350', at least in part, homogenizer 450 can be implemented, e.g., as executable code stored in one or more of memories 414A-414B, with such code being executable by one or more instances of processor 410.

Similarly, homogenizer 450 is an example of an apparatus for homogenizing expected data-harvest yields (of network-related data which, again, can include tracking/KPI data), with such data being generated by cell-sites 102, etc., in a wireless network, e.g., wireless network 200 or 300. Again, KPIs are examples of metrics that are representative of physical things/phenomena. Particular examples of the KPIs include: a count (or rate of occurrence) of instances of a dropped connection between the cell-site and a wireless device (sometimes referred to as 'connection drops'), e.g., radio link failures per second in connected mode, assuming idle mode performance is approximately synced; a count (or rate of occurrence) of instances of a failed attempt to establish a connection between the cell-site and a wireless device (sometimes referred to as 'blocks' or 'handover failure probability' (HOFP)), e.g., handover failures per handover; a rate of occurrence of short dwell time handovers, e.g., short dwell time handovers/second in connected mode for a given short dwell time; handover (HO) rate, e.g., handovers/second in connected mode;

a count of minutes of connection time for all instances of a connection between the cell-site and a wireless device (sometimes referred to as 'MOU'); a count of data consumed for all instances of a connection between the cell-site and a wireless device (sometimes referred to as 'total traffic'); a value representative of throughput on a per-user basis for all instances of a connection between the cell-site and a wireless device (sometimes referred to simply as 'throughput'); or a count of simultaneously active instances of a connection between the cell-site and a wireless device (sometimes referred to as 'actives'). The specific KPIs listed above are merely examples; other KPIs can be used instead of or in addition to one or more of the specific KPIs listed above.

Selection unit 402 is configured to: facilitate a selection of a population of data-sources, e.g., cell-sites 102; and facilitate a selection of a quantity of data as a data-harvest maximum, $H_{max}$. For example, the population can be located in a geographic territory. Selection unit 402 can be further configured to facilitate a selection of a desired number of geographically contiguous zones that are to be included in the territory and/or a selection of a maximum data-retrieval latency.

Decomposition unit 404 is configured to divide the territory into the set of substantially geographically-contiguous zones according to the data-harvest maximum $H_{max}$. Each zone will include at least one data-source, e.g., at least one instance of cell-site 102. For example, a small zone may include a few hundred instances of cell-site 102. Each of the zones does not need to cover a comparable, much less the same, amount of geographical area. Each zone will, however, generate an expected data-harvest yield, $H_{yield}$, that is less than or equal to the data-harvest maximum $H_{max}$, $H_{yield} \leq H_{max}$. It is noted that the data-harvest yield $H_{yield}$ and the data-harvest maximum $H_{max}$ are quantities defined relative to a given period of time. Decomposition unit 404 can be configured, e.g., to minimize a number of zones into which the selected territory is divided.

One or more boundaries of each zone can be described in terms of at least one geographic coordinate. For example, the at least one geographic coordinate can be latitude. As will be discussed in more detail below regarding FIGS. 5A-5B, as a result, each zone can be represented as a stripe defined as an area between two lines of latitude. As another example, the at least one geographic coordinate can be longitude. As will be discussed in more detail below regarding FIGS. 6A-6B, as a result, each zone can be a stripe defined as an area between two lines of longitude. Other definitions for zones are contemplated, for example, polygons, e.g., hexagonal zones.

Decomposition unit 404 can be further configured to establish boundaries of the zones such that at least two of the zones, in terms of the geographic coordinate, are substantially different in size and thereby include different numbers of data-sources with a result being, for each zone, that $H_{yield} \leq H_{max}$, respectively.

Data-harvest maximum, $H_{max}$ is an amount of data that is deemed to be a manageable quantity. Here, a manageable quantity is to be understood as a quantity for which a user attempting to access the same would be expected to experience a data-retrieval latency, L, of no more than a desired maximum latency, $L_{max}$, where $L \leq L_{max}$. For example, the maximum latency, $L_{max}$ can be empirically derived, e.g., $L_{max} \approx 5$ seconds.

Factors that affect the determination of the data-harvest maximum $H_{max}$ includes: the capacity and access time of the infrastructure which stores the data (again, storage-infrastructure in terms of the particular combination of SSD technology, SCSI drive technology, SATA drive technology, etc., is represented in the instances of DSR 504); the bandwidth of the infrastructure which connects the user who seeks access to the data (access-seeker) and the storage-infrastructure; the physical distance separating the access-seeker and the storage-infrastructure; etc. Circa 2005, $L_{max} \approx 5$ seconds corresponded to $H_{max} \approx 1M$ rows of data. Circa 2015, with the progression of technology, $L_{max} \approx 5$ seconds corresponds to $H_{max} \approx 5M$ rows of data.

Monitoring unit 406 is configured to determine, for each zone, a quantity of data $H_{smpl}$ accumulated over a sampling interval (e.g., a sampling interval of 24 hours); estimate the data-harvest yield $H_{yield}$ likely to accumulate during a desired interval, e.g., 30 days (for example, $H_{smpl}$* desired_interval=$\_H_{yield}$, =$H_{smpl}$*30 days); and assess, for each zone, whether the data-harvest yield $H_{yield}$ will exceed the data-harvest maximum $H_{max}$ based on $H_{smpl}$. Based on the assessment from monitoring unit 406, decomposition unit 404 is further configured to adaptively re-establish the boundaries of the zones based on the assessment by the monitoring unit.

Each time that decomposition unit 406 establishes or re-establishes the boundaries for the zones, this triggers the undertaking of resource-provisioning within the selected territory, and within the storage-infrastructure which serves the selected territory. Such resource-provisioning includes one or more of the following: initiating delivery of specific physical resources (infrastructure) to one or more facilities, e.g., data-center 502 (see discussion below); installation and commissioning of specific physical resources after delivery; configuring and activating physical specific resources and/or logical specific resources; testing the specific resources to ensure proper operation thereof; etc.

As an example, assume a period of two years of data collection. Assume a population of 16 instances of cell-site 102, with each instance of cell-site 102 producing 1 data 'snapshot'/day, with each snapshot including 1,500 rows of data. Further assume that there is an accumulation of two years of data such that 2 years*365 days/year*1 snapshot/day*1500 rows/snapshot=1,095,000 rows of data accumulated by each instance of cell-site 102 over the course of 2 years, and such that there is a grand total of 17,520,000 rows of data accumulated collectively by all 16 instances of cell-site 102 over the course of 2 years=1095000 rows of data per instance of cell-site 102 multiplied by 16 instances thereof. Yet further assume that $H_{max}$=5M rows of data.

Accordingly, decomposition unit 404 can be configured to divide the territory into at least 4 zones because 17,520,000 rows divided by $H_{max}$=17,520,000 rows divided 5M rows/zone≈3.50 zone (which, when rounded up to the nearest whole number, is 4 zones).

Continuing to expand the example, decomposition unit 404 can be configured to fill zones with instances of cell-site 102, e.g., progressively (which is not necessarily optimally). Instances of cell-site 102 typically are configured with a negligible amount of memory such that data sourced thereby typically tends to be stored on the instance of BSC 106 connected thereto, respectively. More particularly, decomposition unit 404 can begin to fill zones, e.g., zones 510-516 in FIG. 5A, e.g., by adding instances of cell-site 102 to zones according to the sequence in which the instances of cell-site 102 are encountered as one progresses from north to south in terms of latitude and so as to fill zones with instances of cell-site 102 which share the same instance of BSC 106. Initially, each of zones 510-516 would be filled with 4 instances of cell-site 102 such that 1,095,000 rows of data per instance of cell-site 102 multiplied by 4 instances=4,380,000 rows of data per cell=$H_{yield}$ per zone such that $H_{yield} \leq H_{max}$. Upon filling the first zone, e.g., zone 510, then decomposition unit 404 would begin to fill the second zone, e.g., zone 512, with the next northerly-most instances of cell-site 102 not included the instances of cell-site 102 already included in zone 510. This zone-filling technique would continue for zone 514 and then zone 516. If data existed that was specific to each instance of cell-site 102, then decomposition unit 404 could be further configured to revise the initial zone rosters (of instances of cell-site 102) by selectively rearranging zone rosters to produce lesser-constrained rosters, e.g., an arrangement of rosters that each satisfied $H_{yield} \leq H_{max}$ while also achieving a lower average $H_{yield}$; $\overline{H}_{yield}$.

Selection unit 402 is further configured to facilitate selection of a desired maximum zone size, $S_{max}$. Also, decomposition unit 404 is further configured to: compare the size of each zone against $S_{max}$; and subdivide, for a given zone having a size $S_{given}$ greater than $S_{max}$, the given zone into a number X of new zones, wherein X is one of (1) X=Y, where Y is a quotient, Y=$S_{given}$/$S_{max}$; Y is a positive integer, or (2) X is a next greater whole integer relative to Y, where Y is positive non-integer.

Continuing to expand the example begun above, assume that $S_{max}$=7 zones, and that a server is available which is dimensioned to handle 10 zones. As noted above, initially, the territory will be divided into 4 zones. As instances of cell-site 102 are added to the territory, consequently the number of zones into which the territory is divided will grow. As the number of zones approaches $S_{max}$=7 zones, this signals a looming need for adding additional server capacity and/or data-storage capacity, thereby facility the timing of a decision to purchase such additional server capacity and/or data-storage capacity. A benefit of at least some of the embodiments disclosed herein is that a prediction of when the actual number of zones, $S_{act}$, will exceed $S_{max}$ can be determined more precisely as contrasted with the conventional art, which better facilitates, e.g., 'just-in-time' purchasing of the additional server capacity and/or data-storage capacity (assuming that the cost of such hardware remains relatively constant throughout the period of time during which such purchases could be made). That is, at least some of the embodiments disclosed herein reduce the 'unconfigured' time elapsed between when the additional server capacity and/or data-storage is purchased (i.e., when the 'sunk cost' is incurred') and thus available for configuration and when the actual configuration occurs, as contrasted with the conventional art (again, assuming that the cost of such hardware remains relatively constant throughout the period of time during which such purchases could be made).

Alternatively, instead of purchasing additional server capacity and/or data-storage capacity, and assuming that (1) there are other servers and/or data-storage resources in the system dedicated to other similarly homogenized populations and (2) there exists excess server capacity and/or data-storage capacity available from the other servers and/or data-storage resources, the above-described technique of homogenizing groups/zones facilitates adaptively expanding the number of groups/zones (into which a given population is divided). This is because the 'homogenized' size of any given group/zone lends itself more readily to being offloaded-to/absorbed-by the excess server capacity and/or data-storage capacity otherwise available on the other servers and/or data-storage resources. ZHD index 408/408' can be configured to also track excess server capacity and/or data-storage capacity within a system that serves multiple populations. By contrast, conventional art systems tended to use population-specific techniques by which to apportion server capacity and/or data-storage capacity such that the apportionment technique used with respect to a first population was incompatible with the apportionment technique used with respect to a second population, thereby discouraging if not preventing (as a practical matter) the offloading/ absorbing described above (which is facilitated by the homogenization technique described above). In other words, a benefit of the homogenization technique described above is that it makes excess server capacity and/or data-storage capacity more fungible in terms of its usability across different populations supported by a system.

Decomposition unit 406 is yet further configured to organize data-access requests according to access-seeker (that is, according to which users seek access to the data), respectively. This includes, for each access-seeker, filtering out those requests that are for data-access to data generated (and therefore stored) in the same territory in which the access-seeker is located. This further includes, for each access-seeker, organizing the remaining requests into collections of geographically proximate instances of the corresponding data-storage devices.

Then, decomposition unit 406 can count instances of an attempted-access to each collection, respectively, and compare each attempted-access count against a threshold. Such a threshold can have been selected via selection unit 402. For each attempted-access count that exceeds the threshold, decomposition unit 406 can: allocate (e.g., engage in resource-provisioning for) one or more additional increments of storage-infrastructure (e.g., one or more instances of DSR 504 (discussed below)), for the selected territory; load, onto the one or more additional increments of storage-infrastructure, a duplicate copy of data corresponding to each attempted-access count that exceeded the threshold; and make arrangements to locate the one or more additional increments of storage-infrastructure sufficiently proximal to the selected territory such that an attempt by the given user, who is located in the selected territory, to access at least some of the duplicate copy will experience a data-retrieval latency, $DRL_{exp}$, that is $DRL_{exp} \leq DRL_{max}$.

As an example, consider a situation in which a given access-seeker located in the vicinity of San Diego seeks access to network-related data that is specific to one or more instances, respectively, of a data-source which is located in the San Diego vicinity. In this example, the data-storage infrastructure which stores the desired network-related data is located in the vicinity of Kansas City. If the attempted-access count for the access-seeker eventually satisfies the threshold, then decomposition unit 406 can regard the access-seeker as a user who frequently accesses (a frequent accessor of) the desired network-related data.

If the access-seeker is regarded as a frequent accessor of the desired network-related data, then decomposition unit 406 can determine that the repository for the desired network-related data (and, perhaps, additional network-related data corresponding thereto—together hereafter referred to as the target data) should be re-located from the data-storage infrastructure in the vicinity of Kansas City to the data-storage infrastructure in the San Diego vicinity. Doing so would have the benefit of reducing the data-retrieval latencies that will be experienced by the access-seeker vis-a-vis the target data, while also reducing network congestion attributable to associated network traffic that otherwise would have to traverse the greater path length associated with the target data being stored on the data-storage infrastructure located in the Kansas City vicinity rather than stored one the data-storage infrastructure located in the San Diego vicinity.

Alternatively, if the target data has experienced access attempts by other users in addition to the given access-seeker, then decomposition unit 406 might determine that it is better to duplicate the target data, e.g., by retaining a copy of the target data on the data-storage infrastructure in the Kansas City vicinity and storing an additional copy on the data-storage infrastructure in the San Diego vicinity. In this alternative, the benefits (in the context of future attempts by the given access-seeker and the other access-seekers to access the target data) of having reduced the data-retrieval latencies that will be experienced by the given access-seeker as well as having reduced the noted path-length-related network congestion is assumed to outweigh the additional costs associated with maintaining two copies of the target data, namely the original copy on the data-storage infrastructure in the Kansas City vicinity and the additional copy on the data-storage infrastructure in the San Diego vicinity.

Alternatively, e.g., homogenizer 450 can be configured to regard a population of data-sources as comprising routers (in a wireless network, e.g., wireless network 200 or 300). Accordingly, selection unit 402 would be configured to: facilitate a selection of the population of routers as the data-sources. Selection unit 402 could also be further configured to facilitate a selection of a maximum number of groups of routers $S'_{max}$. The operation of this alternative configuration is similar to that of the configuration of homogenizer 450 discussed above. One difference to be noted is that, unlike instances of cell-site 102, routers do not have a storage relationship with instances of BSC 106 and hence routers are not described as being connected to a common instance of BSC 106.

In FIG. 4A, all of selection unit 402, decomposition unit 404, monitoring unit 406 and ZHD index 408 (and thus homogenizer 450 itself) could be implemented on the same server. Alternatively, one or more of selection unit 402, decomposition unit 404, monitoring unit 406 and ZHD index 408 could be implemented on one or more different servers according to a variety of distributed computing arrangements, respectively. For example, each of selection unit 402, decomposition unit 404, monitoring unit 406 and ZHD index 408 could be implemented on its own server.

Figure 4B:
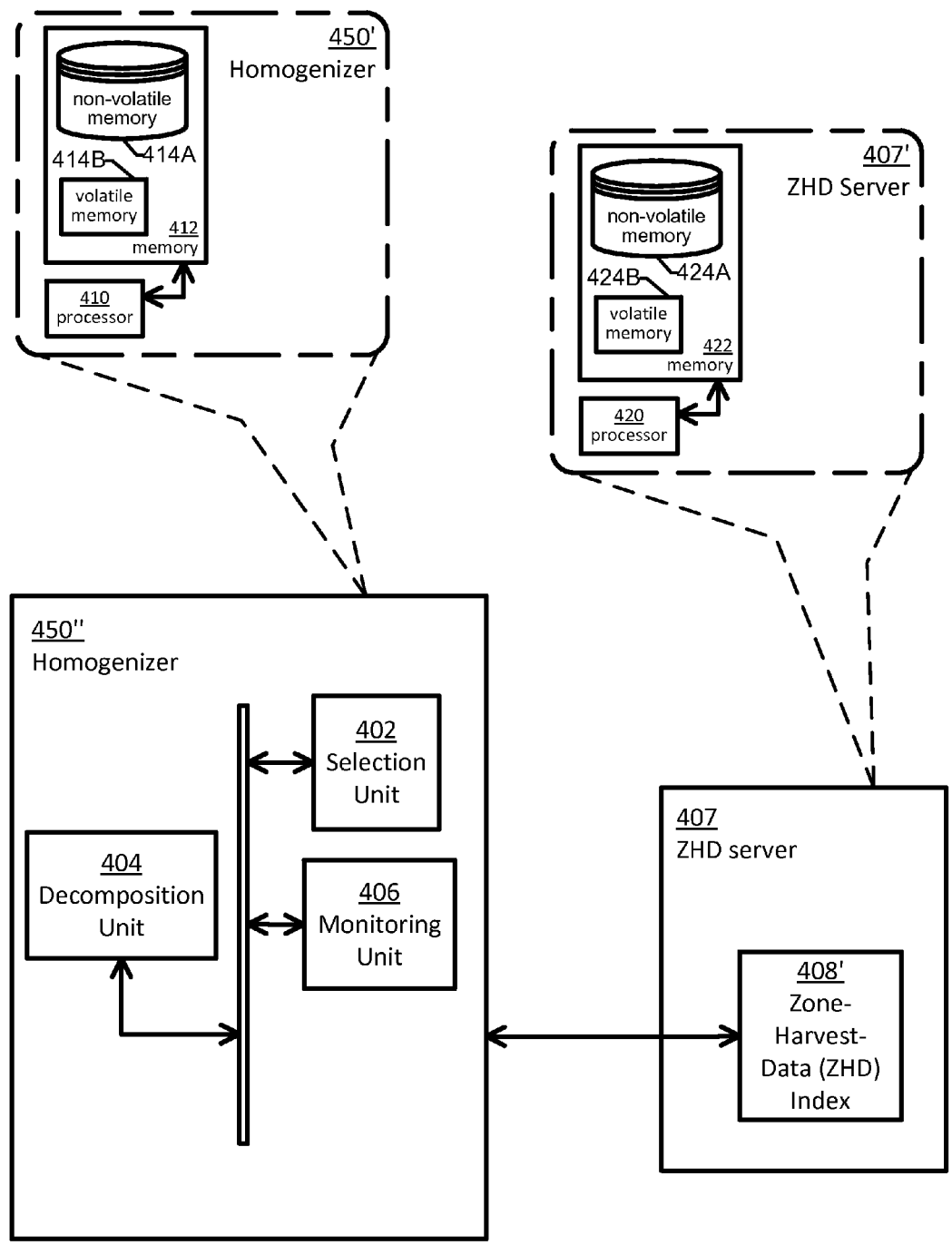
FIG. 4B is a block diagram, according to an embodiment of the present invention, of another homogenizer.

FIG. 4B is a block diagram, according to an embodiment of the present invention, of another homogenizer 450".

Homogenizer 450" is similar to homogenizer 450. Whereas FIG. 4A illustrates ZHD index 408 as being included within homogenizer 450, however, FIG. 4B illustrates a ZHD index 408' as not being included in a homogenizer 450" but instead as being included in (e.g., running on) a ZHD server 407. In terms of physical components (as illustrated by exploded view 407'), ZHD server 407 can include: one or more instances of a processor 420; and memory 422 which itself includes one or more instances of non-volatile memory 424A and one or more instances of volatile memory 424B. At least in part, ZHD index 408' can be implemented, e.g., as executable code stored in one or more of memories 424A-424B, with such code being executable by one or more instances of processor 420.

Figure 5A:
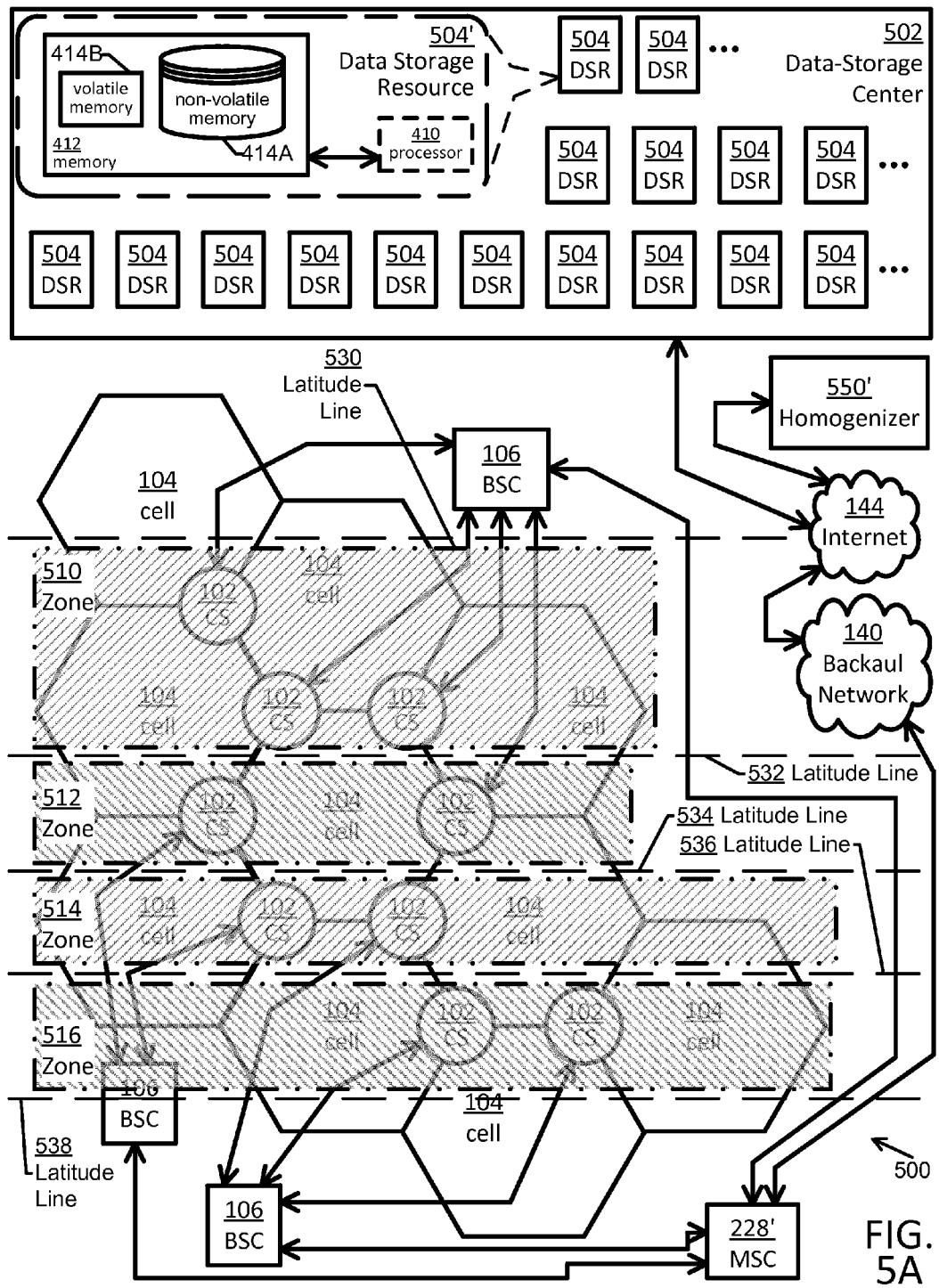
FIGS. 5A-5B are block diagrams, according to an embodiment of the present invention, illustrating an example of the zoning operation of a homogenizer (in particular, a decomposition unit)
Figure 5B:
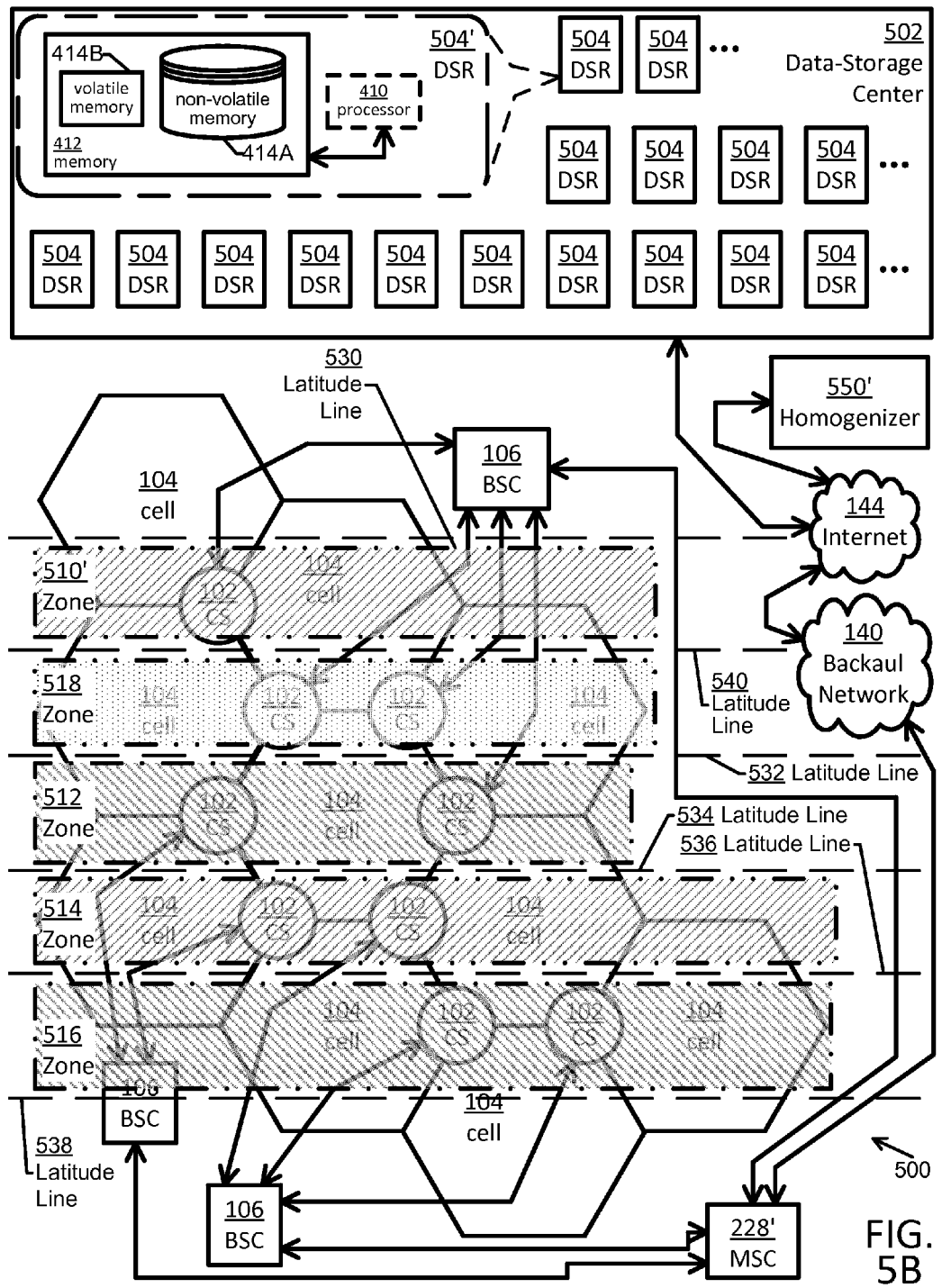

FIGS. 5A-5B are block diagrams, according to an embodiment of the present invention, illustrating an example of the zoning operation of homogenizer 550' (in particular, decomposition unit 404).

Homogenizer 550' is similar to homogenizer 450, and so at least includes the same components as homogenizer 450.

Among other things in FIG. 5A, there is storage-infrastructure 502, e.g., data-storage center, which has been illustrated as connected to homogenizer 550' via internet 144. Data-storage center 502 includes instances of a data storage resource (DSR) 504. In terms of physical components (as illustrated by exploded view 504'), each instance of DSR 504 includes: memory 412 which itself includes one or more instances of non-volatile memory 414A and one or more instances of volatile memory 414B; and one or more instances of an optional (as indicated by the phantom lines) processor 410. An implemented instance of DSR 504 can be, e.g., an SSD (a solid-state drive), a SCSI (small computer system interface) drive, a SATA (a serial AT attachment) drive, etc. As between SSDs, SCSI drives and SATA drives, typically SSDs represent the fastest access times (performance) albeit with the highest initial purchase prices, SATA drives represent the slowest access times (performance) albeit with the lowest initial purchase prices, and SCSI drives represent the middle range in terms of access times (performance) and initial purchase prices.

The resource-provisioning mentioned above further includes determining, e.g., relative to each zone illustrated in FIG. 5A, a location of the corresponding one-or more instances of DSR 504 sufficiently proximal to the zone such that an attempt by a given user, who is located in the selected territory, to access at least some of the data-harvest yield $H_{yield}$ will experience a data-retrieval latency, $DRL_{exp}$, that is $DRL_{exp} \leq DRL_{max}$.

In FIG. 5A, as an example, it is assumed that a user has used selection unit 402 of homogenizer 450 to do the following: select a geographic territory that includes all nine instances of cell-site 102 which are illustrated in FIG. 5A; and select lines of latitude as the boundaries for the zones into which the selected territory will be decomposed. Also in FIG. 5A, it is assumed that decomposition unit 404 has divided the selected territory into a set of four zones, 510, 512, 514 and 516, that are substantially geographically-contiguous. Zone 510 is bounded by, i.e., has boundaries corresponding to, latitude lines 530 and 532. Zone 512 is bounded by latitude lines 532 and 534. Zone 514 is bounded by latitude lines 534 and 536. Zone 516 is bounded by latitude lines 536 and 538. Again, in FIG. 5A, the illustration of nine instances of cell-site 102, ten instances of cell 104 and four zones 510-516 are exemplary and simplified for ease of illustration; other numbers of instances of cell-site 102 and instances of cell 104 are contemplated, as are other appropriately corresponding numbers of zones.

Each of zones 510, 512, 514 and 516 includes at least one data-source, respectively. In particular, zone 510 includes three instances of a data-source (that can produce network-related data which, again, includes tracking/KPI data), namely, three instances of cell-site 102. And each of zones 512, 514 and 516 includes two instances of a cell-site-data-source (namely, two instances of cell-site 102), respectively. Though zones 512, 514 and 516 are similar in size, zone 510 is substantially larger in size in the sense that zone 510 spans a substantially larger latitudinal distance than each of zones 512, 514 and 516, respectively. Despite zone 510 being larger in size, nevertheless each of zones 510-516 will produce an expected data-harvest yield, $H_{yield}$, that is less than or equal to the data-harvest maximum $H_{max}$, $H_{yield} \leq H_{max}$.

Monitoring unit 406 determines a quantity of data $H_{smpl}$ accumulated over a sampling interval for each of zones 510-516, respectively. Based on $H_{smpl}$, monitoring unit 406 predicts what a corresponding value of $H_{yield}$ will, namely $H_{yield}^{prediction}$, will be. For each of zones 510-516, monitoring unit 406 assesses whether the data-harvest yield $H_{yield}$ will exceed the data-harvest maximum $H_{max}$ based on $H_{smpl}$, by comparing $H_{yield}^{prediction}$ and $H_{max}$. Expanding the example of FIG. 5A, it is assumed that monitoring unit 406 has determined that $H_{yield}$ for zone 510 will exceed $H_{max}$ based. Responsive to that assessment, decomposition unit 404 adaptively reduces the size of zone 510, i.e., re-establishes the boundary of zone 510, thereby producing zone 510' as illustrated in FIG. 5B, which is bounded by latitude lines 530 and 540. In addition, decomposition unit 404 also adds a new zone 518 bounded by latitude lines 540 and 532.

Figure 6A:
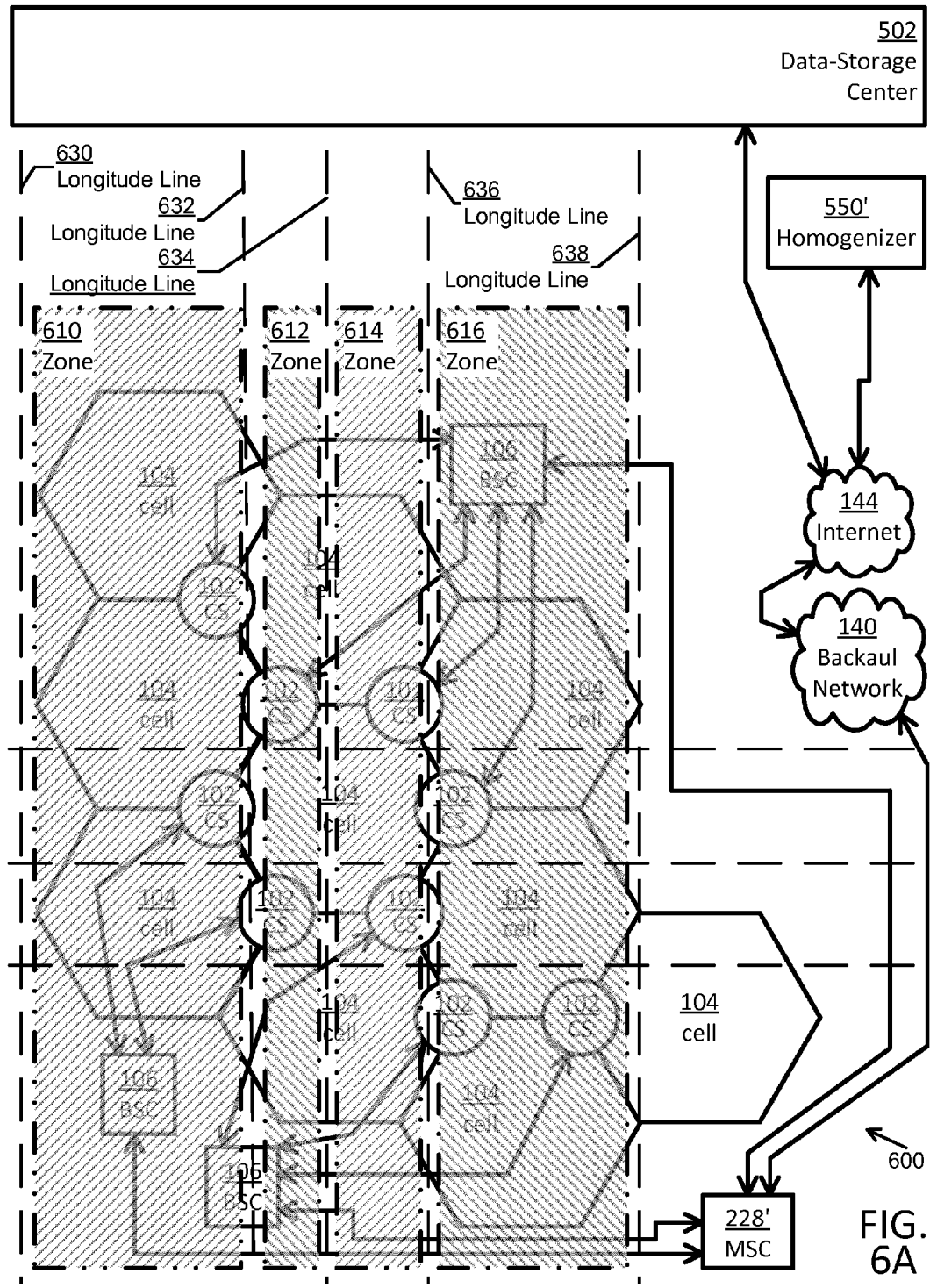
FIGS. 6A-6B are block diagrams, according to an embodiment of the present invention, illustrating another example of the zoning operation of a homogenizer (in particular, a decomposition unit)
Figure 6B:
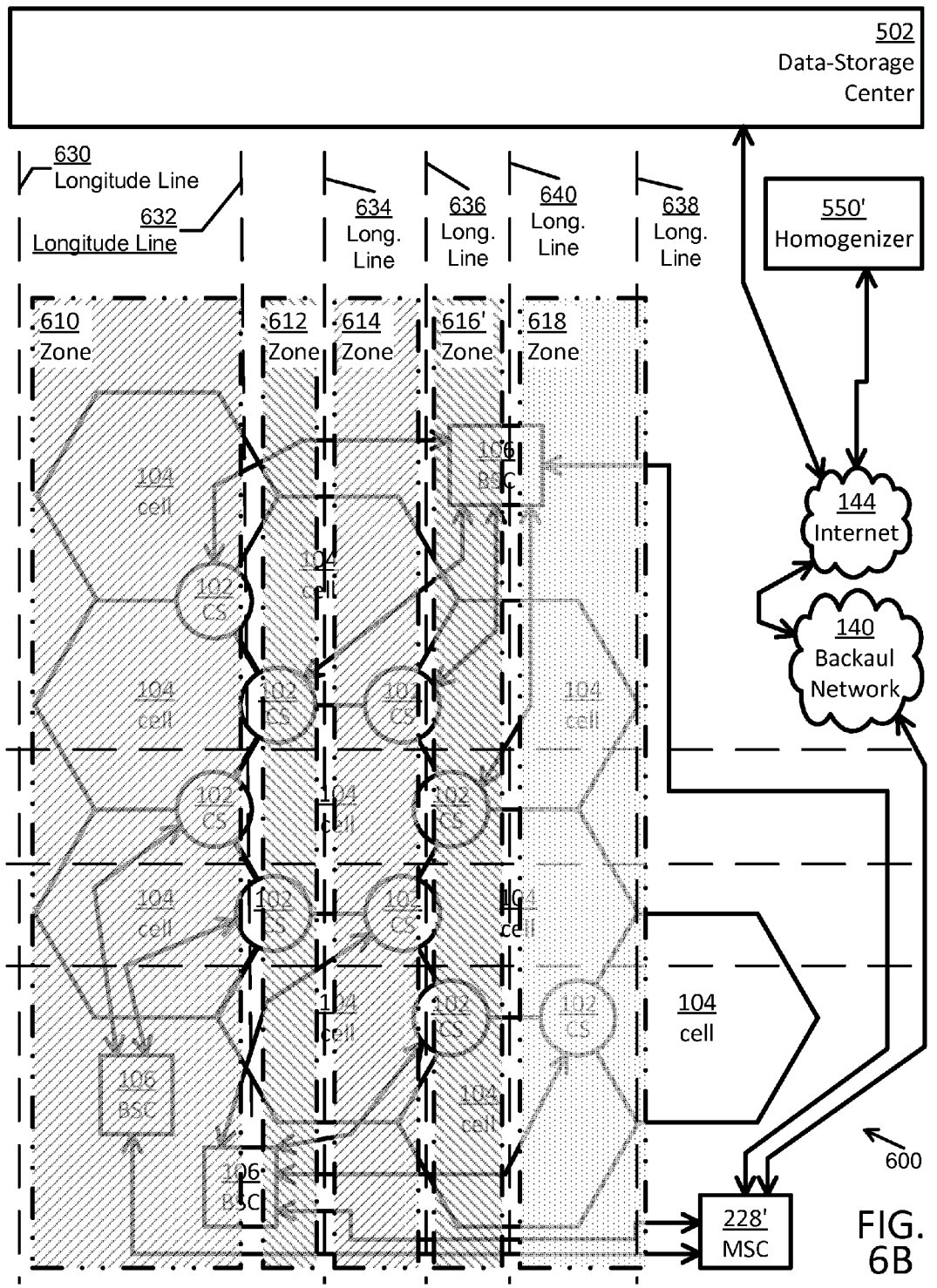

FIGS. 6A-6B are block diagrams, according to an embodiment of the present invention, illustrating another example of the zoning operation of homogenizer 550' (in particular, decomposition unit 404).

In FIG. 6A, as an example, it is assumed that a user has used selection unit 402 of homogenizer 450 to do the following: use selection unit 402 to select a geographic territory that includes all nine instances of cell-site 102 which are illustrated in FIG. 6B; and use selection unit 402 to select lines of longitude as the boundaries for the zones into which the selected territory will be decomposed. Also in FIG. 6A, it is assumed that decomposition unit 404 has divided the selected territory into a set of four zones, 610, 612, 614 and 616, that are substantially geographically-contiguous. Zone 610 is bounded by, i.e., has boundaries corresponding to, longitude lines 630 and 632. Zone 612 is bounded by longitude lines 632 and 634. Zone 614 is bounded by longitude lines 634 and 636. Zone 616 is bounded by longitude lines 636 and 638.

Each of zones 610, 612, 614 and 616 includes at least one data-source, respectively. In particular, each of zones 610, 612 and 614 includes two cell-site-data-source (namely, two instances of cell-site 102), respectively. Zone 616 includes three instances of a cell-site-data-source (namely, three instances of cell-site 102).

Zones 610 & 616 are similar in size in the sense that zones 610 and 616 each span a about the same longitudinal distance. Similarly, zones 612 and 614 are similar in size. Despite zones 610 & 616 being larger in size than zones 612 & 616, nevertheless each of zones 610-616 will produce an expected data-harvest yield, $H_{yield}$, that is less than or equal to the data-harvest maximum $H_{max}$, $H_{yield} \leq H_{max}$.

Monitoring unit 406 determines a quantity of data $H_{smpl}$ accumulated over a sampling interval for each of zones 610-616, respectively. Based on $H_{smpl}$, monitoring unit 406 predicts what a corresponding value of $H_{yield}$ will, namely $H_{yield}^{prediction}$, will be. For each of zones 610-616, monitoring unit 406 assesses whether the data-harvest yield $H_{yield}$ will exceed the data-harvest maximum $H_{max}$ based on $H_{smpl}$ by comparing $H_{yield}^{prediction}$ and $H_{max}$. Expanding the example of FIG. 6A, it is assumed that monitoring unit 406 has determined that $H_{yield}$ for zone 616 will exceed $H_{max}$ based. Responsive to that assessment, decomposition unit 404 adaptively reduces the size of boundary 616, i.e., re-establishes the boundary of zone 616, thereby producing zone 616' as illustrated in FIG. 6B, which is bounded by longitude lines 636 and 640. In addition, decomposition unit 404 also adds a new zone 618 bounded by longitude lines 640 and 632.

Let it be assumed that a second instance 502' (not illustrated) of data-storage center 502 is provided. Let it be further assumed that data-storage center 502 is located relatively closely to the selected territory, whereas data-storage center 502' is located remotely relative to the selected territory.

A server (not illustrated in FIG. 4) can be provided on which can be loaded homogenizer 450, and thus on which can be loaded selection unit 402. The server can be located remotely to the selected territory such that the server and data-storage center 502' can be regarded as being located substantially farther away from the selected territory than data-storage center 502. A zone-harvest-data (ZHD) index 408 can be included as a functional unit within homogenizer 450, and thus on the server. ZHD index 408 relates zone identities and identities of the one or more DSR 504 (within data-storage center 502') on which are stored the data harvested the zones, respectively.

Figure 7:
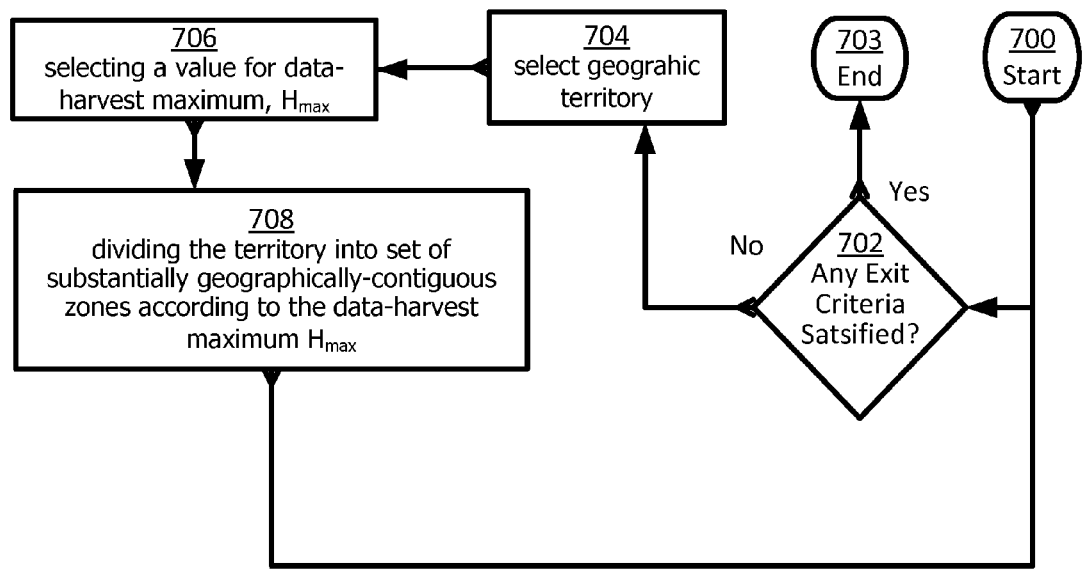
FIG. 7 is a flowchart illustrating a method, according to embodiments of the present invention, of homogenizing expected data-harvest yields in a wireless network.

Monitoring unit 406 is configured to organize data-access requests by a given user, for which the data to be accessed is generated outside the selected territory, into collections of geographically proximate instances of the corresponding data-storage devices;

FIG. 7 is a flowchart illustrating a method, according to embodiments of the present invention, of homogenizing expected data-harvest yields in a wireless network, e.g., wireless networks 200, 300, etc.

In FIG. 7, there is a loop. As a general design consideration, no loop should be infinite, i.e., inescapable. Accordingly, flow in FIG. 7 starts at block 700 and proceeds to a decision block 702, where a processor, e.g., processor 410, decides if any exit criteria have been satisfied. If the outcome of decision block 702 is yes (one or more of the exit criteria are satisfied), then flow proceeds to block 703 and ends. If the outcome of decision block 702 is no (none of the exit criteria has been satisfied), then flow proceeds to a block 704.

In block 704, processor 410 (via selection unit 402) facilitates selection of a geographic territory in which are located data-sources, e.g., instances of cell-site 402. From block 704, flow proceeds to a block 706. In block 706, processor 410 (via selection unit 402) facilitates selection of a quantity of data to be used as a data-harvest maximum, $H_{max}$. From block 706, flow proceeds to a block 708.

In block 708, processor 410 (via decomposition unit 404) divides the territory into a set of substantially geographically-contiguous zones according to the data-harvest maximum $H_{max}$. As such, each zone includes at least one data-source; and each zone generates an expected data-harvest yield, $H_{yield}$, that is less than or equal to the data-harvest maximum $H_{max}$, $H_{yield} \leq H_{max}$.

The present invention is not limited to the particular embodiments illustrated in the drawings and described above in detail. Those skilled in the art will recognize that other arrangements could be devised. The present invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present invention has been described with reference to specific illustrative embodiments, modifications and variations of the present invention may be constructed without departing from the spirit and scope of the present invention as set forth in the following claims.

While the present invention has been described in the context of methods and apparatuses (as noted above), those skilled in the art will appreciate that the mechanism of the present invention is capable of being implemented and distributed in the form of a computer-usable medium (in a variety of forms) containing computer-executable instructions, and that the present invention applies equally regardless of the particular type of computer-usable medium which is used to carry out the distribution. An exemplary computer-usable medium is coupled to a computer such the computer can read information including the computer-executable instructions therefrom, and (optionally) write information thereto. Alternatively, the computer-usable medium may be integral to the computer. When the computer-executable instructions are loaded into and executed by the computer, the computer becomes an apparatus for practicing the invention. For example, when the computer-executable instructions are loaded into and executed by a general-purpose computer, the general-purpose computer becomes configured thereby into a special-purpose computer. Examples of suitable computer-usable media include: volatile memory such as random access memory (RAM); nonvolatile, hard-coded or programmable-type media such as read only memories (ROMs) or erasable, electrically programmable read only memories (EEPROMs); recordable-type and/or re-recordable media such as floppy disks, hard disk drives, compact discs (CDs), digital versatile discs (DVDs), etc.; and transmission-type media, e.g., digital and/or analog communications links such as those based on electrical-current conductors, light conductors and/or electromagnetic radiation.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A computer-implemented method for homogenizing expected data-harvest yields, the method being implemented in a computer system that includes one or more physical processors and one or more memory components, the method comprising:

selecting a population of data-sources;

selecting a quantity of data as a data-harvest maximum, $H_{max}$; and dividing the population into a set of groups according to the data-harvest maximum $H_{max}$ such that:

each group includes at least one data-source; and each group generates an expected data-harvest yield, $H_{yield}$, that is less than or equal to the data-harvest maximum $H_{max}$, $H_{yield} \leq H_{max}$.

2. The method of claim 1, wherein:

the data-sources are cell-sites;

the population is located in a geographic territory;

the territory is divided into substantially geographically contiguous zones; and the groups are located in the zones, respectively, such that members of a given group will be physically located in the corresponding zone and will be connected to a common base station controller (BSC).

3. The method of claim 2, wherein:

one or more boundaries of each zone can be described in terms of at least one geographic coordinate;

the method further comprises:

selecting a desired number of zones to be included in the territory; and wherein the dividing the territory into a set of substantially geographically-contiguous zones includes:

establishing boundaries of the zones such that at least two of the zones, in terms of the geographic coordinates, are substantially different in size and thereby include different numbers of data-sources with a result being $H_{yield} \leq H_{max}$.

4. The method of claim 3, wherein:

the at least one geographic coordinate is latitude; and each zone is a stripe defined as an area between two latitudes.

5. The method of claim 3, wherein:

the data-harvest yield $H_{yield}$ and the data-harvest maximum $H_{max}$ are quantities defined relative to a given period of time;

the method further comprises:

determining, for each zone, a quantity of data $H_{smpl}$ accumulated over a sampling interval;

assessing, for each zone, whether the data-harvest yield $H_{yield}$ will exceed the data-harvest maximum $H_{max}$ based on $H_{smpl}$; and adaptively re-establishing the boundaries of the zones based on the assessment.

6. The method of claim 3, wherein:

selecting a desired maximum zone size, $S_{max}$;

the dividing the territory into a set of substantially geographically-contiguous zones further includes:

comparing the size of each zone against $S_{max}$; and subdividing, for a given zone having a size $S_{given}$ greater than $S_{max}$, the given zone into a number X of new zones, wherein X is one of:

X=Y, where Y is a quotient, $Y=S_{given}/S_{max}$; Y is a positive integer; or

X is a next greater whole integer relative to Y, where Y is positive non-integer;

the data-harvest yield $H_{yield}$ and the data-harvest maximum $H_{max}$ are quantities defined relative to a given period of time;

the method further comprises:

determining, for each zone, a quantity of data $H_{smpl}$ accumulated over a sampling interval; and assessing, for each zone, whether the data-harvest yield $H_{yield}$ will exceed the data-harvest maximum $H_{max}$ based on $H_{smpl}$.

7. The method of claim 2, wherein:

for each group, members thereof are connected to the same base station controller (BSC), respectively.

8. The method of claim 1, wherein:

the data-sources are routers.

9. The method of claim 1, wherein:

the data-harvest maximum $H_{max}$ is such that user who attempts to access a table representing such an amount of data can be expected to experience a data-retrieval latency, L, of L≤≈5 seconds.

10. The method of claim 1, further comprising:

undertaking, for each of the groups, resource-provisioning.

11. A computer-implemented method for locating data-storage devices, the method being implemented in a computer system that includes one or more physical processors and one or more memory components, the method comprising:

selecting a geographic territory in which are located data-sources;

selecting a quantity of data as a data-harvest maximum, $H_{max}$; and dividing the territory into a set of substantially geographically-contiguous zones according to the data-harvest maximum $H_{max}$ such that:

each zone includes at least one data-source; and each zone generates an expected data-harvest yield, $H_{yield}$, that is less than or equal to the data-harvest maximum $H_{max}$, $H_{yield} \leq H_{max}$;

resource-provisioning, for each zone, one or more data-storage devices on which the corresponding data-harvest yield $H_{yield}$ will be stored;

selecting a maximum data-retrieval latency, $DRL_{max}$; and determining, for each zone, a geographic location of the corresponding one-or more data-storage devices sufficiently proximal to the zone such that an attempt by a given user, who is located in the geographic territory, to access at least some of the data-harvest yield $H_{yield}$ will experience a data-retrieval latency, $DRL_{exp}$, that is $DRL_{exp} \leq DRL_{max}$.

12. The method of claim 11, wherein the undertaking, for each group, of the resource-provisioning includes:

physically configuring storage-infrastructure.

13. The method of claim 11, wherein:

one or more boundaries of each zone can be described in terms of at least one geographic coordinate;

the method further comprises:

selecting a desired number of zones to be included in the territory; and wherein the dividing the territory into a set of substantially geographically-contiguous zones includes:

establish boundaries of the zones such that at least two of the zones, in terms of the geographic coordinates, are substantially different in size and thereby include different numbers of data-sources with a result being $H_{yield} \leq H_{max}$.

14. The method of claim 13, wherein:

the at least one geographic coordinate is latitude; and each zone is a stripe defined as an area between two latitudes.

15. The method of claim 13, wherein:

the data-harvest yield $H_{yield}$ and the data-harvest maximum $H_{max}$ are quantities defined relative to a given period of time;

the method further comprises:

determining, for each zone, a quantity of data $H_{smpl}$ accumulated over a sampling interval; and assessing, for each zone, whether the data-harvest yield $H_{yield}$ will exceed the data-harvest maximum $H_{max}$ based on $H_{smpl}$; adaptively re-establishing the boundaries of the zones based on the assessment.

16. The method of claim 13, further comprising:
selecting a desired maximum zone size, $S_{max}$;
dividing the territory into a set of substantially geographically-contiguous zones the method further comprises:
comparing the size of each zone against $S_{max}$; and
subdividing, for a given zone having a size $S_{given}$ greater than $S_{max}$; the given zone into a number X of new zones, wherein X is one of:
X=Y, where Y is a quotient, $Y=S_{given}/S_{max}$; Y is a positive integer; or
X is a next greater whole integer relative to Y, where Y is positive non-integer;
the data-harvest yield $H_{yield}$ and the data-harvest maximum $H_{max}$ are quantities defined relative to a given period of time;
determining, for each zone, a quantity of data $H_{smpl}$ accumulated over a sampling interval; and
assessing, for each zone, whether the data-harvest yield $H_{yield}$ will exceed the data-harvest maximum $H_{max}$ based on $H_{smpl}$.

17. The method of claim 11, wherein:
the data-harvest maximum $H_{max}$ is such that user who attempts to access a table representing such an amount of data can be expected to experience a data-retrieval latency, L, of L≤≈5 seconds.

18. The method of claim 11, further comprising:
providing a SI server to implement a selection unit module with which the given user can make one or more selections and thereby attempt access;
locating the SI server remotely to the selected territory such that the SI server is located substantially farther away from the selected territory than the one or more data-storage devices corresponding to the zones of the selected territory;
providing a zone-harvest-data (ZHD) index that relates zone identities and identities of the one or more storage devices on which are stored the data harvested therefrom, respectively; and
locating the ZHD index in memory local to the SI server.

19. The method of claim 11, further comprising:
organizing data-access requests by the given user, for which the data to be accessed is generated outside the selected territory, into collections of geographically proximate instances of the corresponding data-storage devices;
counting instances of an attempted-access to each collection, respectively;
selecting an access-request threshold;
comparing each attempted-access count against the threshold;
allocating one or more additional storage devices, for the selected territory;
loading, onto the one or more additional storage devices, a duplicate copy of data corresponding to each attempted-access count that exceeded the threshold; and
locating the one or more additional storage devices sufficiently proximal to the selected territory such that an attempt by the given user, who is located in the selected territory, to access at least some of the duplicate copy will experience a data-retrieval latency, $DRL_{exp}$, that is $DRL_{exp} \leq DRL_{max}$.

20. An apparatus for homogenizing expected data-harvest yields, the apparatus comprising:
one or more processors configured to execute computer program modules;
memory for storing said computer program modules;
a selection unit module configured to:
facilitate a selection of a geographic territory in which are located data-sources;
facilitate a selection of a quantity of data as a data-harvest maximum, $H_{max}$; and
a decomposition unit module communicating with said selection module and configured to divide the territory into a set of substantially geographically-contiguous zones according to the data-harvest maximum $H_{max}$ such that:
each zone includes at least one data-source; and
each zone generates an expected data-harvest yield, $H_{yield}$, that is less than or equal to the data-harvest maximum $H_{max}$, $H_{yield} \leq H_{max}$.

21. The apparatus of claim 20, wherein:
one or more boundaries of each zone can be described in terms of at least one geographic coordinate;
the selection unit module is further configured to:
facilitate a selection of a desired number of zones to be included in the territory; and
the decomposition unit module is further configured to:
establish boundaries of the zones such that at least two of the zones, in terms of the geographic coordinate, are substantially different in size and thereby include different numbers of data-sources with a result being $H_{yield} \leq H_{max}$.

22. The apparatus of claim 21, wherein:
the at least one geographic coordinate is latitude; and
each zone is a stripe defined as an area between two latitudes.

23. The apparatus of claim 21, wherein:
the data-harvest yield $H_{yield}$ and the data-harvest maximum $H_{max}$ are quantities defined relative to a given period of time; and
the apparatus further includes:
a monitoring unit module communicating with said decomposition unit module and configured to:
determine, for each zone, a quantity of data $H_{smpl}$ accumulated over a sampling interval; and
assess, for each zone, whether the data-harvest yield $H_{yield}$ will exceed the data-harvest maximum $H_{max}$ based on $H_{smpl}$.

24. The apparatus of claim 23, wherein the decomposition unit module is further configured to:
adaptively re-establish the boundaries of the zones based on the assessment by the monitoring unit module.

25. The apparatus of claim 21, wherein:
the selection unit module is further configured to:
facilitate selection of a desired maximum zone size, $S_{max}$; and
the decomposition unit module is further configured to:
compare the size of each zone against $S_{max}$; and
subdivide, for a given zone having a size $S_{given}$ greater than $S_{max}$; the given zone into a number X of new zones, wherein X is one of:
X=Y, where Y is a quotient, $Y=S_{given}/S_{max}$; Y is a positive integer; or
X is a next greater whole integer relative to Y, where Y is positive non-integer;
the data-harvest yield $H_{yield}$ and the data-harvest maximum $H_{max}$ are quantities defined relative to a given period of time; and
the decomposition unit module is yet further configured to:

determine, for each zone, a quantity of data $H_{smpl}$ accumulated over a sampling interval; and assess, for each zone, whether the data-harvest yield $H_{yield}$ will exceed the data-harvest maximum $H_{max}$ based on $H_{smpl}$.

26. The apparatus of claim 20, wherein:

the data-harvest maximum $H_{max}$ is such that user who attempts to access a table representing such an amount of data can be expected to experience a data-retrieval latency, L, of $L \leq \approx 5$ seconds.

* * * * *